US006765933B1

(12) United States Patent
Michel et al.

(10) Patent No.: US 6,765,933 B1
(45) Date of Patent: Jul. 20, 2004

(54) INTER-CHIP PORT AND METHOD FOR SUPPORTING HIGH RATE DATA STREAMS IN SDH AND SONET TRANSPORT NETWORKS

(75) Inventors: David Michel, Sava (IL); Amir Dabby, Holon (IL)

(73) Assignee: ECI Telecom Ltd., Petach-Tikva (IL)

( * ) Notice: Subject to any disclaimer, the term of this patent is extended or adjusted under 35 U.S.C. 154(b) by 794 days.

(21) Appl. No.: 09/638,898

(22) Filed: Aug. 15, 2000

(30) Foreign Application Priority Data

Aug. 18, 1999 (IL) ................................................ 131461

(51) Int. Cl.[7] ................................................ H04J 3/02
(52) U.S. Cl. ..................................... 370/539; 370/541
(58) Field of Search ............................... 370/539, 392, 370/358, 465, 535, 541, 537

(56) References Cited

U.S. PATENT DOCUMENTS

| | | | | |
|---|---|---|---|---|
| 4,967,405 A | * | 10/1990 | Upp et al. | 398/50 |
| 4,998,242 A | * | 3/1991 | Upp | 370/392 |
| 5,040,170 A | * | 8/1991 | Upp et al. | 398/50 |
| 5,257,261 A | * | 10/1993 | Parruck et al. | 370/522 |
| 6,058,119 A | | 5/2000 | Engbersen et al. | |

FOREIGN PATENT DOCUMENTS

WO WO 96/33563 10/1996

OTHER PUBLICATIONS

Transwitch Corporation, "PHAST-12: Programmable, High-Performance ATM, SONET/SDH Terminator for Level 12 Device (TXC-06112)", earliest date unknown, www.transwitch.com, marked "copyright 1995-1998".
Transwitch Corporation, Dec. 1, 1998, www.transwitch.com.
IBM, "SMART: Scalable SDH/SONET Technology", May 31, 1999, www.zurich.ibm.com/Project/CS/smart.htm.

* cited by examiner

Primary Examiner—Ajit Patel
(74) Attorney, Agent, or Firm—Browdy and Neimark, P.L.L.C.

(57) ABSTRACT

A method and an inter-chip communication port for supporting a concatenated type of a high order SDH/SONET signal, with processing Transport Overhead bytes (TOH) and Path Overhead bytes (POH) thereof, in a structure which comprises a group of chips, wherein each of the chips is capable of supporting a lower order SDH/SONET signal with processing its TOH and POH, while one of them named a master chip is operative to coordinate operation of the remaining chips named slaves so as to cause them working in accord as one unit.

30 Claims, 5 Drawing Sheets

INTER-CHIP PORT AND METHOD FOR SUPPORTING HIGH RATE DATA STREAMS IN SDH AND SONET TRANSPORT NETWORKS

FIELD OF THE INVENTION

The present invention relates to a method and a device for supporting high rate data streams, with handling overhead layers thereof, and in particular to a chip assembly with an inter-chip communication port capable of processing a layer of transport overhead (TOH) and a layer of path overhead (POH) of high order signals in transport telecommunication networks based on either SDH or SONET standards

BACKGROUND OF THE INVENTION

The Synchronous Digital Hierarchy (SDH) and its North-American equivalent, the Synchronous Optical Network (SONET), are the globally accepted, closely related and compatible standards for data transmission in the public wide area network (WAN) domain. Recently, SDH/SONET has also been adopted by the ATM Forum as a recommended physical-layer transmission technology for ATM (Asynchronous Transfer Mode) network interfaces.

SONET and SDH govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 $\mu$s (8000 frames/s). Because of compatibility between SDH and SONET, their basic frames are similarly structured, but differ in dimension which fact reflects the basic transmission rates of 155.52 and 51.84 Mb/s, respectively. To be more specific, a basic frame format of SDH is 9 rows of 270 bytes, or 2430 bits/frame, corresponding to an aggregate frame rate of 155.52 Mb/s. For SDH systems, the mentioned basic frame transmitted at the rate 155.52 Mb/s forms the fundamental building block called Synchronous Transport Module Level-1 (STM-1). For SONET systems, the basic frame has dimensions of 9 rows by 90 byte columns and, being transmitted at the rate 51.84 Mb/s, forms the appropriate fundamental building block called Synchronous Transport Signal Level-1 (STS-1 or OC-3). The transmission sequence in both SONET and SDH is as follows: the byte in the first row and the first column will be transmitted first; it is followed by the byte to its right, in the same row and so on, from left to right and from top to bottom.

Figure 1:
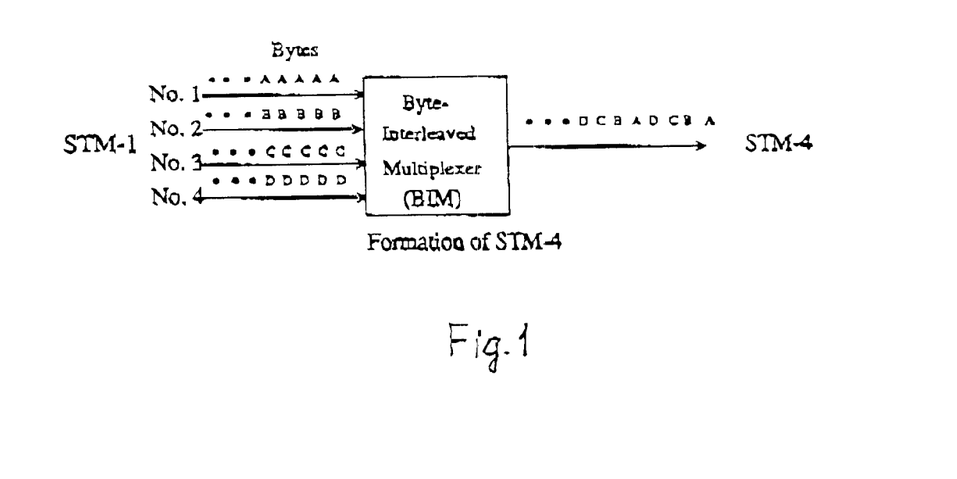
FIG. 1 is a block-diagram schematically illustrating formation of a high order SDH signal STM-4 from four signals STM-1 by byte-interleaved multiplexing.

Lower rate payloads (data portions transmitted at rates smaller than the basic ones) are mapped into the fundamental building blocks STM-1 and STS-1 respectively, while higher rate signals (payloads) are generated by byte-interleavingly multiplexing N fundamental building blocks to form STM-N signals (in SDH) or STS-N signals (in SONET). FIG. 1 explains the principle of byte-interleaved multiplexing on a specific example where four STM-1s are combined into one STM-4. The multiplexing is effected by byte-interleaved multiplexer (BIM) which produces a sequence of bytes where one byte from No. 1 building block is followed by one byte from No. 2 building block and so on. All low-speed signals must be frame-aligned prior to multiplexing.

STM-4/STM4c signal having a data rate 622.08 Mb/s (4×155.52 Mb/s) is one of the high order signals (payloads) in the SDH system. In SONET, it corresponds to STS-12/STS-12c having the same data rate. The signal STM4/STM-4c, being equivalent to STS-12/STS-12c, consists of four STM-1 or four STS-3 building blocks. The mentioned high order signal STM-4/STM4c can be transmitted in two ways.

A first way is to transmit it over at least four individual parallel paths: e.g., four STM-1 (or STS-3) paths. The signal transmitted along parallel paths is called STM-4. Each path may itself consist of up to three separate STS-1 paths, thus the STM-4 signal may comprise up to 12 individual paths, each transmitting an individual STM-1 signal with its individual payload.

Alternatively, the signal can be transmitted as a concatenated stream over a single path; in that case the obtained signal (which is called STM-4c i.e., "concatenated") is sent as a single combined payload in one synchronous payload envelope (SPE). The fact that the signal follows as a concatenated (multiframe) payload, as well as location of the SPE borders, are indicated using a number of so-called overhead bytes which are present in the frame.

Each basic frame of SONET or SDH comprises an information portion called Information Payload and a service portion called Overhead (OH), the latter being subdivided into a number of areas of overhead bytes (for example a Path Overhead layer POH, a Transport Overhead layer TOH), predestined for various service and control functions. One of such areas is a column of Path Overhead (POH) bytes, which is present both in the SDH and SONET frames and usually resides within the Information Payload area. POH supports performance monitoring, status feedback, signal labeling, user channel and a tracing function in a path, i.e. carries information about the signal from end to end through the entire transmission system. The POH is added and dismantled at or near service origination/termination points defining the path, and is not processed at intermediary nodes.

In SONET, the Transport overhead layer which is responsible for transport through the network, is broken into two parts—Line Overhead (LOH) and Section Overhead (SOH). Section overhead (SOH) is that overhead necessary for reliable communication between network elements such as terminals and regenerators. Line overhead (LOH) was established to allow reliable communication of necessary information between more complicated network elements such as terminals, digital cross-connects, multiplexers and switches.

Figure 2:
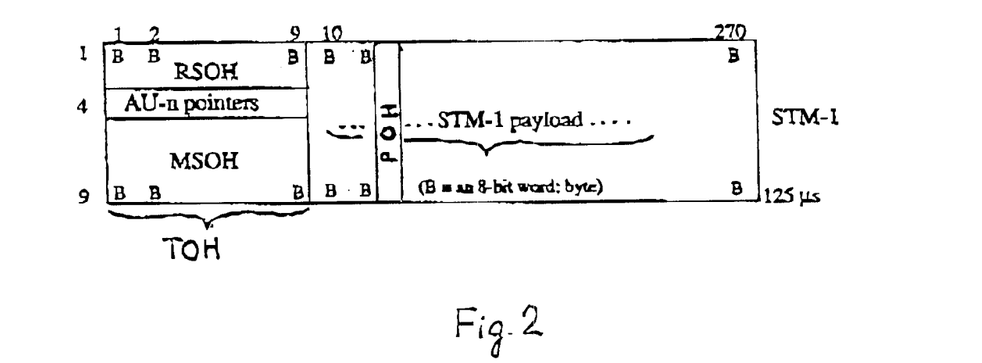
FIG. 2 schematically illustrates the frame structure of the SDH fundamental building block signal STM-1.

In SDH, no Transport overhead is directly defined. However, any SDH basic frame comprises a Multiplex Section Overhead (MSOH) being analogous to LOH in SONET, and a Regenerator Section Overhead (RSOH) which play the part of SOH in SONET. FIG. 2 schematically illustrates an STM-1 frame with its overhead sections. It is therefore considered, that the layer of Transport overhead in SDH is actually formed by the mentioned MSOH and RSOH. POH column is considered a part of STM-1 payload. There is also a row of overhead bytes bearing information on so-called AU-pointers (administrative unit pointers) which are considered to belong neither to TOH nor to POH, and are analyzed separately.

It should be noted that, in a not concatenated signal, each of the component building blocks has its individual SPE and bears its own TOH and POH similarly to that shown in FIG.

2. In a concatenated signal having a single common SPE, the TOH area is assembled from individual TOHs of the component building blocks, while the POH column is one and common for the SPE, since it is intended for identifying and controlling a single path.

During decoding and checking of a SONET or SDH signal transmitted in a path, it is generally "stripped down" in layers by a control system, first decoding and checking the section information, then the line information and thereafter the path information. At each step, error checking is provided and errors (if detected) must be indicated either to the local control system, or to the originating path terminal element to inform about troubles in the path.

TranSwitch corporation entered the market with two products relevant to the subject of the present application. One of them is called SOT-3 (TXC-03003B) being an overhead terminator for STM-1/STS-3/STS-3c transmission applications. The other is PHAST-12 (TXC-06112) being a highly integrated SONET/SDH terminator device designed for ATM cell, frame, higher order multiplexing, and transmission applications. A single PHAST-12 device can terminate four individual STS-3c or STM-1 lines, as well or a single OC12/12c (corresponds to STM-4/4c) line. Each SONET/SDH terminator has an associated line interface block that performs clock recovery for four 155.52 Mbit/s signals or single 622.08 Mbit/s serial operation. A parallel line interface port and an expansion port together allow four PHAST devices to operate in unison for OC-48/STM-16 applications. Since the second device is designed for ATM applications, no capability to do re-timing on the receive side exists. To do the POH processing, four more chips would be required at the output side of the device.

IBM® Microelectronics Division, jointly with IBM Zurich Research, recently developed a so-called SMART chip designed in the frame of a Scalable and Modular Architecture for SDH/SONET Technology announced in the following websites: http://www.zurich.ibm.cor/projects/CS/smart.htm and http://www.zurich.ibm.com/Technology/SDH-SONET/SMART.htn. (The sites were last modified on 19.04.1999 and 26.04.1999, respectively.)

According to the announcement, the SMART chip is an integrated SDH/SONET framer technology, allowing multiple ATM (Asynchronous Transfer Mode) cell streams to be mapped into either four STS-1, four STM-1, one STS-3, one STM-4, or one STM-4c SDH/SONET frame(s), by using the same chip. Four identical SMART chips can operate in parallel to support one STM-16/STS-48 signal (to be distinguished from STM-16c/STS-48c) combining either sixteen 155-Mb/s or four 622-Mb/s ATM streams. SMART chip also includes clock recovery, clock synthesis functions and serializer/deserializer functions.

The basic component of SMART is a single 155 Mb/s macro performing the STM-1/STS-3c SDH/SONET frame processing. This component consists of a transmit part for creating SDH/SONET frames and mapping ATM cell or PPP packet streams into these frames and a receive part for receiving frames on the line interface side and extracting ATM cells or PPP packets from these frames. Beside the payload mapping this component creates/analyses all the section and path 25 overhead bytes defined in regional and international standards (ITU-T BellCore, ANSI, and ETSI) and scrambles the SDH/SONET frames. The macro contains already the necessary "hooks" to interconnect several of these macros for distributed processing of STM-4/STS-12 and STM-4c/STS-12c frames.

Though functionality of the SMART chip has been announced, no specific information has been disclosed concerning its internal structure enabling the macros to be "hooked" for distributed processing of the STM-4 and STM-4c signals.

It should be noted that, though four identical SMART chips are announced to operate in parallel to support one STM-16/STS-48 signal, and though it has been declared that SMART represents a building block approach covering the whole STM-x/STS-x family, no information is available on how concatenated versions of the above family can be treated. In other words, no technical solution has been described for supporting STM-xc/STS-xc signals.

SUMMARY OF THE INVENTION

It is therefore the object of the present invention to propose a solution to the above-mentioned problem of supporting concatenated high order SDH/SONET signals. A further object of the invention is to provide a technology for supporting any high order SDH/SONET signal, whether it is concatenated or not.

In the frame of the present application, the term "supporting" should be understood as handling an SDH/SONET signal (concatenated or non-concatenated high order signal, or a low order signal), with processing Transport Overhead bytes (TOH) and Path Overhead bytes (POH) thereof.

The above object can be achieved by a method of supporting a concatenated type of a high order SDH/SONET signal with processing TOH and POH thereof by:

utilizing a group of chips each being capable of supporting a lower order SDH/SONET signal with processing its TOH and POH, and establishing inter-chip communication between said chips where one of them named a master chip is capable of coordinating operation of the remaining chips named slaves, thereby providing operation of said chips in accord as one unit.

The novelty of the method resides in the fact that it enables the concatenated high order signals (i.e., those having a multiframe synchronous payload envelope SPE) to be supported using a number of chips with a lower capability. Note that, for example, FIFO (First-In First-Out memory) of each of the component chips is adapted for handling the payload of a component said building block signal only.

In one particular version of the method, wherein said SDH/SONET high order signal is an N-fold lower order SDH/SONET signal named a building block signal; the method includes:

providing said group comprising N identical chips, wherein each of said chips having a FIFO, arranging inter-chip communication between said chips in the group by enabling said master chip to coordinate said slaves so as to perform operations including the following:

synchronous handling, by each of the N chips including the master, 1/N-th portion of said concatenated high order signal with processing the TOH of a respective building block signal, and processing the POH of said high order concatenated signal by said master chip, thereby providing operation of said chips in accord as one unit having N-fold FIFO.

According to the most preferred version of the method, it also enables supporting a non-concatenated type of said SDH/SONET signal with processing Transport Overhead bytes (TOH) and Path Overhead bytes (POH) thereof, wherein said non-concatenated SDH/SONET high order signal is an N-fold lower order SDH/SONET signal named a building block signal having its TOH and POH;

the method comprises a step of arranging said inter-chip communication for enabling each of the chips to individually handle one respective said building block signal with processing the TOH and the POH thereof, thereby providing parallel handling of all said building block signals.

The method usually includes a preliminary step of defining the mode of operation of said module by a controller, for reversibly arranging the inter-chip communication between two modes, wherein one of the modes is a concatenated mode corresponding to said concatenated signal transmitted over a single path, and the other mode is a non-concatenated mode corresponding to the non-concatenated signal transmitted over at least N paths. In practice, it is accomplished by reconfiguring a so-called inter-chip port of a module comprising the group of chips.

Three pointer bytes H1 to H3 in the line overhead (LOH) of TOH indicate the location of the beginning of the SPE, which is very important for synchronizing the work of the chips in the module. Thus, the method includes determining the location of the beginning of the SPE. It should be noted, that the handling of the concatenated high order signal, upon determining the beginning of its synchronous payload envelope (SPE), includes detecting whether said SPE is multi-frame by examining byte J1 of the POH and issuing a command by said master chip to inform said slaves on the beginning of their accord operation including synchronous handling the respective portions of said high order signal.

The accord operations include so-called FIFO operations, in other words, said synchronous handling the respective portions of the high order signal includes synchronous writing of its payload portions into the FIFOs of said chips respectively, and synchronous reading of said payload portions therefrom. The FIFO operations are required for buffering the incoming signals and synchronizing thereof with the clock of the receiving system (and vice versa)—so-called re-timing.

In the case of the non-concatenated signal, said payload portion is the information payload of one of the building block signals, i.e., a separate payload comprising its POH column.

In the case of the concatenated signal, said payload portion is a 1/N-th fragment of the multi-frame information payload of the high order SDH/SONET signal, wherein said chips handle respective portions of the multi-frame payload (and only the master chip handles POH of the whole concatenated signal).

Each of said respective portions of the multi-frame concatenated payload (i.e. portions of its synchronous payload envelope SPE, without TOH) comprises bytes belonging to a particular one of said N building blocks of the high order signal; these portions are defined according to so-called phases of the byte-interleaved multiplexing corresponding to the chips' numbers in the module.

More particularly, the method includes strictly synchronizing the FIFOs operations of said chips by said master chip, i.e., simultaneous resetting read and write counters of all FIFOs in the module according to the master's commands (such as transmit direction read/write address reset, receive direction read/write address reset) and simultaneously performing said FIFO operations by all the chips in the module.

Yet another operation, which becomes available owing to the inter-chip communication, is passing various alarms known in the SONET/SDH protocol (such as LOS—loss of signal, LOF—loss of frame, LOP—loss of pointer, AIS-P—path alarm indication signal), if determined by at least one of the slave chips, to the master chip. The determined alarms are then reported from the complete module by generating common alarm signals.

The method further includes handling of parity calculations over the high order signal (or payload), using the inter-chip communication for producing information on errors, if determined. Each type of the parity calculations (say, calculation of overhead bytes B1, B2 or B3) is coordinated among the chips of the module in a serial fashion.

According to the basic version of the method, N is equal to 4, said SDf/SONET building block signal is the fundamental building block STM-1/STS-3, and said high order SDH/SONET signal is either STM-4/STS-12, or STM-4c/STS-12c.

Consequently, each of said four identical chips is a chip capable of processing overhead of the first three layers of the SONET/SDH protocol for the SDH fundamental building block STM-1/STS-3 signal; said three layers being SOH, LOH and POH (in other words, TOH and POH).

For example, said chip may constitute a chip called TPOH (Transport—Path OverHead) developed by ECI Telecom® Ltd., Israel.

In the present application, a module comprising four such chips will be described to illustrate an example of the inter-chip port and its operation.

In another version of the method, the N is equal to 4, said SDH/SONET building block signal is a signal STM-4/STS-12, and said high order SDH/SONET signal is either STM-16/STS-48, or STM-16c/STS-48c.

In this case, each of said four identical chips may constitute a SMART® chip developed by IBM® Inc. for processing TOH and POH of the SDH signal STM-4/STS-12.

According to a second aspect of the invention, for supporting a concatenated high order SDH/SONET signal in a module comprising a group of chips there is provided an inter-chip communication port; each of said chips is capable of supporting a lower order SDH/SONET signal while one of them named a master chip is capable of coordinating operation of the remaining chips named slaves.

According to one preferred embodiment, wherein said high order SDH/SONET signal has its Transport Overhead bytes (TOH) and Path Overhead bytes (POH), and is an N-fold lower order SDH/SONET signal named a building block signal and having its TOH and POH, said module comprises a group of N identical chips, each of said chips having a FIFO and being capable of processing TOH and POH of said building block signal;

said inter-chip communication port having a mode of operation for supporting a concatenated (i.e., having a multiframe payload) said high order signal, wherein said master chip is capable of controlling said slaves in a manner that:

each of said chips including the master is caused to handle a 1/N-th portion of said concatenated high order signal with processing the TOH of its respective building block signal, and said master chip processes the POH of said high order concatenated signal, thereby dividing said high order signal between the chips and causing them to work in accord (as one unit) to handle thereof.

According to the preferred embodiment of the inter-chip communication port, it is also capable of operating in another mode for handling a non-concatenated said high order SDHI/SONET signal, wherein each of the chips individually handles one said building block signal and processes the TOH and the POH thereof, thereby providing parallel handling of the building block signals.

In the most preferred embodiment, said inter-chip port is selectively operable in at least one of said operating modes including a concatenated mode corresponding to said concatenated signal, and a non-concatenated mode corresponding to said not concatenated signal; the inter-chip communication port thereby rendering said module capable of handling TOH and POH of the SDH/SONET high order signal being an N-fold SDH/SONET building block signal, both in the case where said signal is concatenated and in the case where it is not. In practice, the inter-chip communication port is re-configurable by a microcontroller.

In other words, in the concatenated mode all chips of the module operate in accord as one unit to handle a common multi-frame payload envelope (SPE) of said signal, and in the non-concatenated mode each of the chips operates individually to handle a synchronous payload envelope (SPE) of a corresponding said building block signal, the module thereby handling N said building block signals (i.e., N paths) in parallel.

For implementing the inter-chip communication, said module is capable of determining the location of the beginning of the SPE by examining pointer bytes H1 to H3 in the Transport overhead (TOH) and of detecting whether said SPE is multi-frame by examining byte J1 of the Path overhead (POH).

The inter-chip communication port is capable of issuing an alarm if the concatenation indicator does not match the preliminary selected mode of the module. This alarm is called "loss of pointer in the path" (LOP-P).

In the concatenated mode, said inter-chip port is capable of enabling said master chip to synchronize the FIFOs of said chips to provide simultaneous resetting the read and write counters thereof, and further to initiate synchronous FIFO read and write operations in all the chips in the module, thereby causing said FIFOs to handle respective payload portions of the concatenated high order signal. The master is adapted to indicate to slaves' FIFOs when an overhead byte is handled, and when a payload byte is handled.

The inter-chip communication port comprises
a plurality of controllable serial channels between said chips, wherein in each of the serial channels a serial output port of one chip is connected to a serial input port of one adjacent chip, and
a plurality of controllable parallel channels between said chips, wherein in each of the parallel channels an output port of one (master) chip is connected to input ports of all other (slaves) chips;
said serial and parallel channels being operative both in the receiving and the transmitting directions.

The inter-chip communication port is controllable by a microcontroller.

One of the described serial channels is intended for collecting alarms indications, if determined by at least one of the slave chips, and passing thereof to the master chip. The mentioned alarm indications are, for example, those known in the SONET/SDH protocol (such as LOS—loss of signal, LOF—loss of frame, LOP—loss of pointer, AIS-P—alarm indication signal in the path. The determined alarm indications are then to be reported from the master chip, as a resulting alarm indication of the complete module; the reporting is performed by means of generating alarm signals based on the collected complete information, via a separate serial channel. These operations are provided both in the concatenated, and in the non-concatenated modes.

The inter-chip communication port enables handling parity calculations in the module over the high order payload, for producing error information if errors are found, wherein said parity calculations (say, calculation of overhead bytes B1, B2 or B3) are coordinated among the four chips of the module in a serial fashion (i.e., using the serial channels for accumulating partial calculations performed at each of the chips). Calculations of B3 are performed in the concatenated mode only, while calculations of B1 and B2 are held in any mode. Parity calculations concerning overhead bytes B1, B2, and B3 are performed in different serial channels.

The parallel channels of the inter-chip communication port serve, for example, for indicating the beginning of SPE and for coordinating operations of the FIFOs, provided by the master chip to the slave chips in the concatenated mode.

According to the basic embodiment of the invention, N is equal to 4, said SDH/SONET building block signal is the SDH fundamental building block STM-1/STS-3, and said high order SDH/SONET signal is either STM-4/STS-12, or STM-4c/STS-12c.

In this embodiment, each of said four identical chips is a chip capable of processing overhead of the first three layers of the SONET/SDH protocol for the SDH fundamental building block STM-1/STS-3 signal; said three layers being SOH, LOH and POH.

For example, a chip TPOH developed in ECI® Telecom Ltd, Israel, can be used for implementing the above-mentioned function. In this application, an assembly of four such chips will be described to illustrate an example of the inter-chip port and its operation.

In accordance with yet another embodiment of the invention, said N is equal to 4, said SDH/SONET building block is STM-4/STS-16, and said high order SDH/SONET signal is either STM-16/STS-48, or STM-16c/STS-48c.

In the above-mentioned embodiment, said module may comprise four identical SMART® chips of IBM®, each being capable of processing the TOH and POH for the building block signal STM-4/STM-4c.

According to yet another aspect of the invention, there is provided a module for supporting a high order SDH signal STM-Nc (and optionally also STM-N) or a high order SONET signal STS-Nc (and optionally also STS-N), the module comprising four chips each being capable of handling an STM-(1/4)N or STS-(1/4)N building block signal, and an inter-chip communication port as described above. Other characteristic features of the inter-chip port and the module according to the invention will become apparent from the detailed description which follows.

BRIEF DESCRIPTION OF THE DRAWINGS

The present invention will be further described in more detail with reference to a number of drawings in which FIGS. 1 and 2 provide explanations of some basic terms of SONET/SDH, and FIGS. 3 to 7 illustrate embodiments of the invention in the form of non-limiting examples only:

DETAILED DESCRIPTION OF THE PREFERRED EMBODIMENTS

Figure 3:
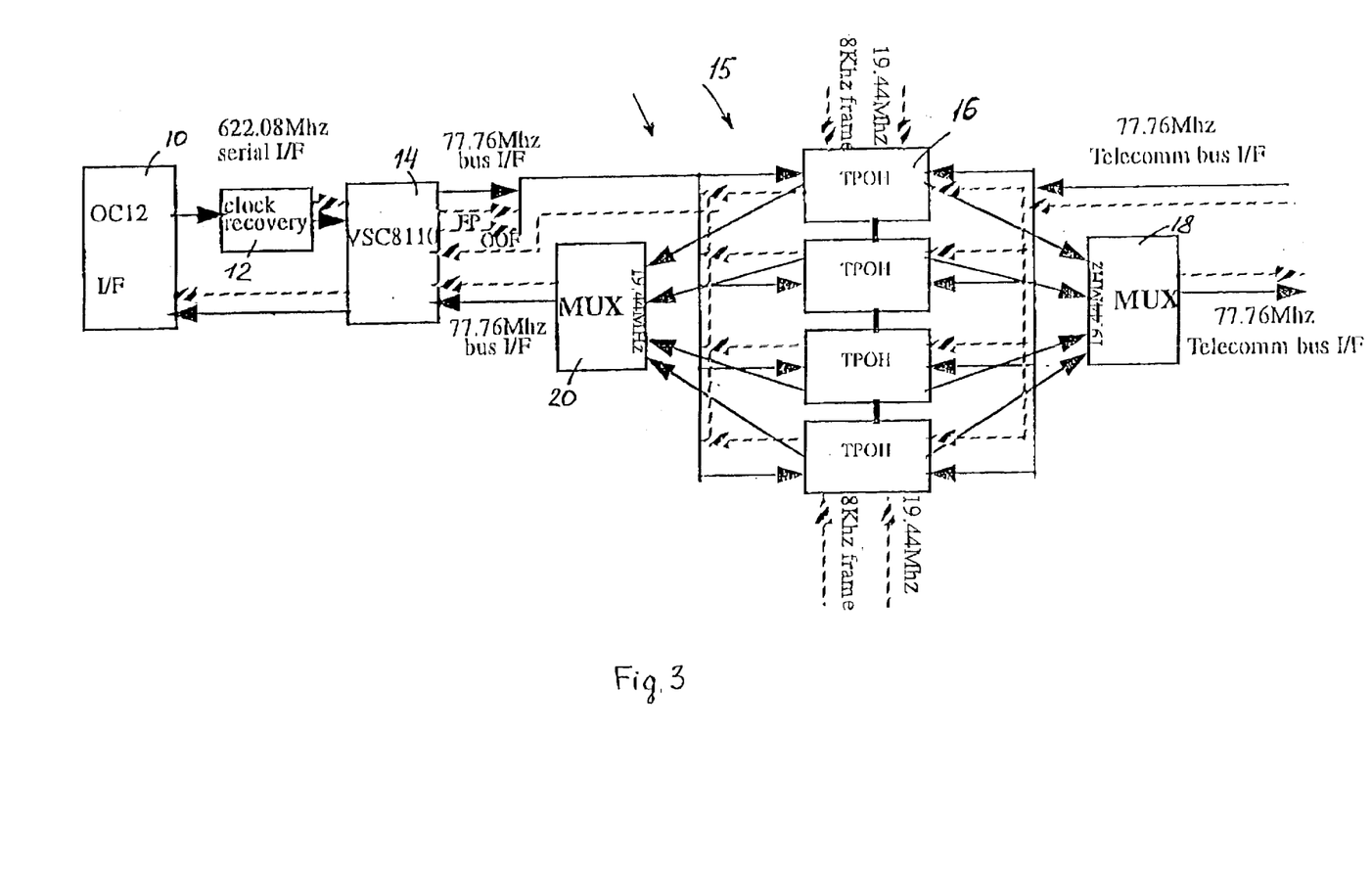
FIG. 3 is a schematic diagram showing an example of conveying a high order SDH signal via a four-chip module according to the invention.

FIG. 3 illustrates an example, where a high order signal OC-12, being equivalent to STM-4, is received from an OC-12 serial interface 10 (see solid lines for data) at a frequency of 622.08 Mhz. The signal undergoes clock recovery at block 12 and undergoes serial-to-parallel processing (S/P) in a Vittese chip 14, so that its frequency is now 77,76 Mhz (⅛ of 622.08 Mhz) which is the frequency of STM-4/STM-4c signal transmitted over a bus interface by bytes. The STM-4 (or STM-4c) is applied in parallel to a module 15 comprising four identical chips 16 which are marked TPOH. Each of the chips 16 is capable of handling TOH and POH of the SDH fundamental building block STM-1. Timing is illustrated by dotted lines; it can be seen that the chips are clocked both at the frequency 8 Khz (i.e., per one SDH frame), and at the frequency 19.44 Mhz (i.e., per one byte in a payload having one fourth the rate of the STM-4/STM-4c). Owing to that, each TPOH chip performs ¼ of STM-4/STM-4c, though their operation depends on the mode (concatenated or not) of the high order signal. Upon handling the four component signal parts by the four chips 16, these component parts are multiplexed by a multiplexer 18 to compose the 77.76 Mhz signal (the finally processed STM-4/STM-4c signal) to be transmitted over the 77.76 Mhz telecommunication bus interface. (In an alternative embodiment, the component signal parts processed by four TPOH chips 16 may be passed for tributary processing by other devices, instead of the multiplexing.) At the transmit side of the illustrated module the operations are as follows. The STM-4 or STM-4c signal is transmitted from the interface of the telecommunication bus at the frequency of 77.76 Mhz, fed to the four TPOH chips 16 which are caused to process it in cooperation according to the mode of the signal. Quarters of the signal are then multiplexed in block 20 (identical to block 18) and the complete STM-4 signal is passed through the Vittese chip to the OC-12 serial interface.

Figure 4:
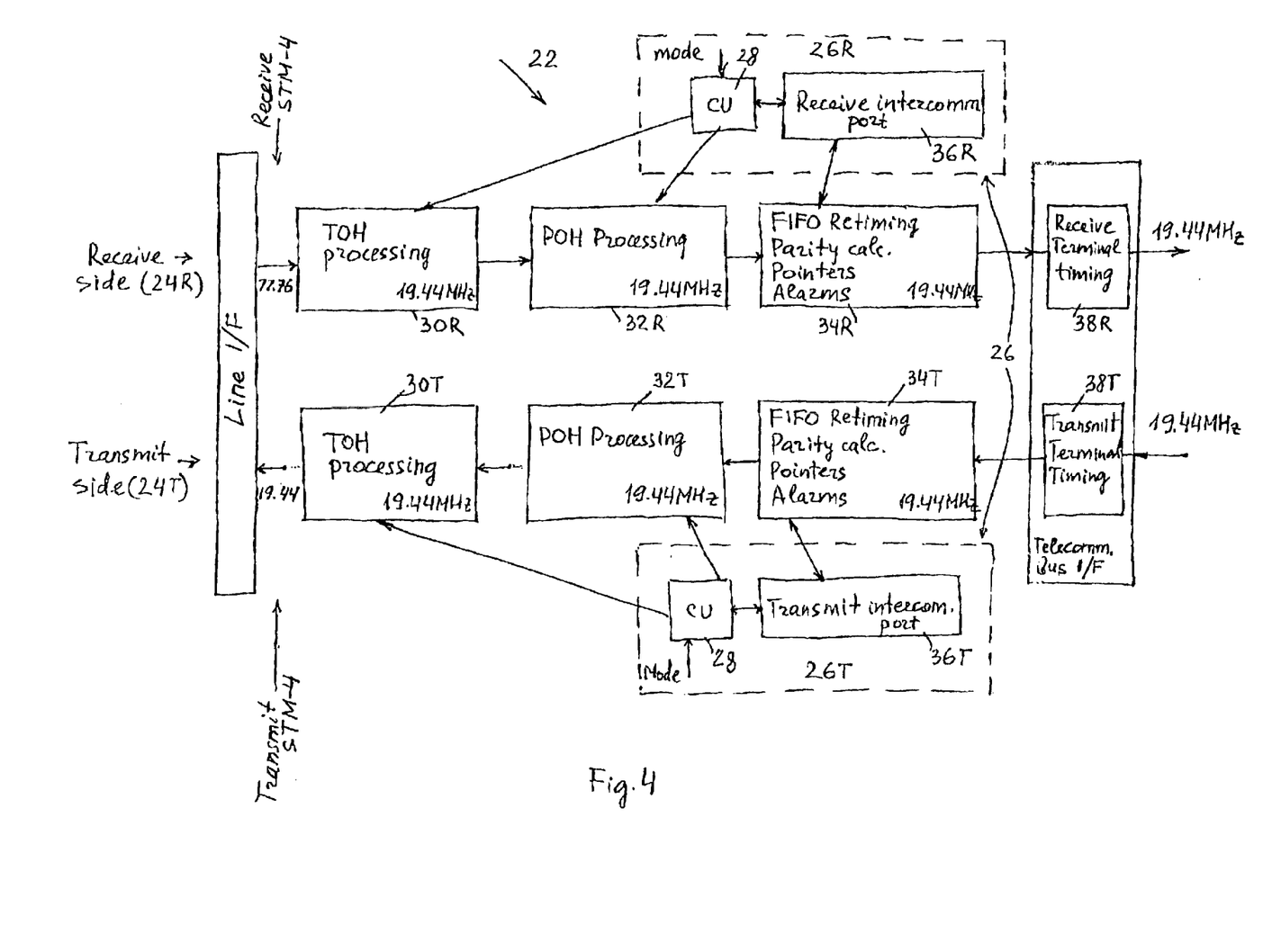
FIG. 4 is a schematic block-diagram of one embodiment of a chip of the module according to the invention.

FIG. 4 schematically illustrates how the components (i.e. the quarters) of the STM-4/STM-4c signal are processed in the module. The module 22 comprises four identical component chips 24 (only one chip is shown in the schematic block-diagram illustrating this embodiment). The chip 24 is capable of handling one STM-1 component building block signal in two mutually opposite directions, at a Receive side and a Transmit side of the chip (marked 24R and 24T, respectively). The module also comprises an inter-chip communication port shown with the aid of a dotted contour 26; the port is common for the four chips and is schematically divided into two sides thereof: a Receive Intercommunication Port 26R and a Transmit Intercommunication Port 26T. The port 26 includes a microcontroller interface generally indicated CU 28 which is responsible for the functioning of the module according to the selected mode (concatenated or non-concatenated).

Each of the chips 24 is capable of performing functions which can schematically be defined as follows: the processing of Transport Overhead of a ¼ of the high order signal, the processing of Path Overhead thereof, and performing a group of other operations concerning pointers, parity calculations, alarms and FIFO re-timing. Operational blocks initiated by software commands and being responsible for the mentioned tasks are schematically marked 30, 32 and 34 with indexes R and T to indicate each of the blocks at the receive and transmit sides of the chip.

An STM-4/STM-4c signal received at 77.76 Mhz is first processed by block 30R which is clocked at 19.44 Mhz, i.e. the TOH processing is performed by one chip over one fourth portion of the high order signal; it also depends on the mode to which the module is preliminary set by the microcontroller via its interface 28. In the non-concatenated mode, the mentioned ¼-th portion will constitute one complete STM-1 component signal with its individual SPE (synchronous payload envelope) within which the TOH location is known. In the concatenated mode, the ¼-th portion is a portion of the integral SPE, comprising TOH corresponding to a particular building block signal, so each of the chips receives its TOH portion for processing. The TOH processing includes framing, line timing, descrambling and a number of operations with the aid of an inter-chip communication port 26, some of which will be further described with reference to FIGS. 5a,b,c and 6. The POH processing is performed in block 32R which comprises POH processor and memory. POH processing of the component portions depends on the selected mode of the module (the control is schematically shown with the aid of a connection to block 28). In the non-concatenated mode, block 32R processes POH of one component STM-1 signal corresponding to this particular chip. In the concatenated mode, only a chip assigned to be the master will utilize its block 32R for processing the common path overhead of the STM-4c signal. The remaining group of operations such as processing of pointers, FIFO re-timing, parity calculations and processing of alarms (see block 34R) are performed by the chips of the module with the aid of an intercommunication port 36R and under control of the microcontroller interface 28. The Inter-communication port 36R (as well as 36T) coordinates transfer of information between the four chips 24 and can schematically be sub-divided into two ports: a serial port and a parallel port, which will become apparent from FIGS. 5a, b, c and 6. Functions of the serial are utilized both in the concatenated, and non-concatenated mode. Functions of the parallel port are used for processing the concatenated signal only. Upon having been handled by the chip 24, the corresponding portion of the received signal obtains terminal timing in block 38R and is issued to the telecommunication bus interface at 19.44 Mhz for further handling, for example for multiplexing. In another application, further tributary processing of the 19.44 Mhz signal can be provided by other devices, instead of the multiplexing.

Operations similar to the above-described ones take place at the transmit side 24T of the chip, when it is utilized for handling ¼ of a transmitted STM-4 signal.

Figure 5A:
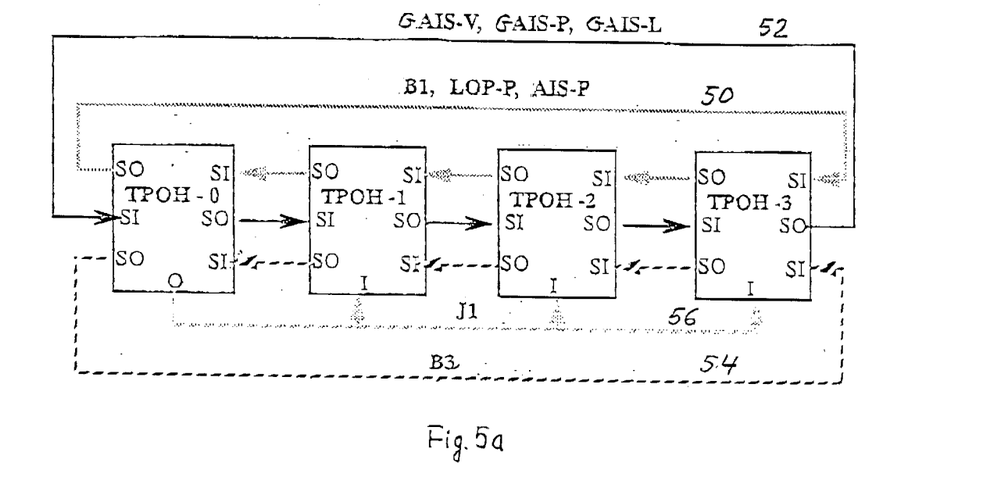
FIG. 5a is a schematic block-diagram illustrating inter-chip communication provided by the inter-chip port both in the concatenated and non-concatenated modes.
Figure 5B:
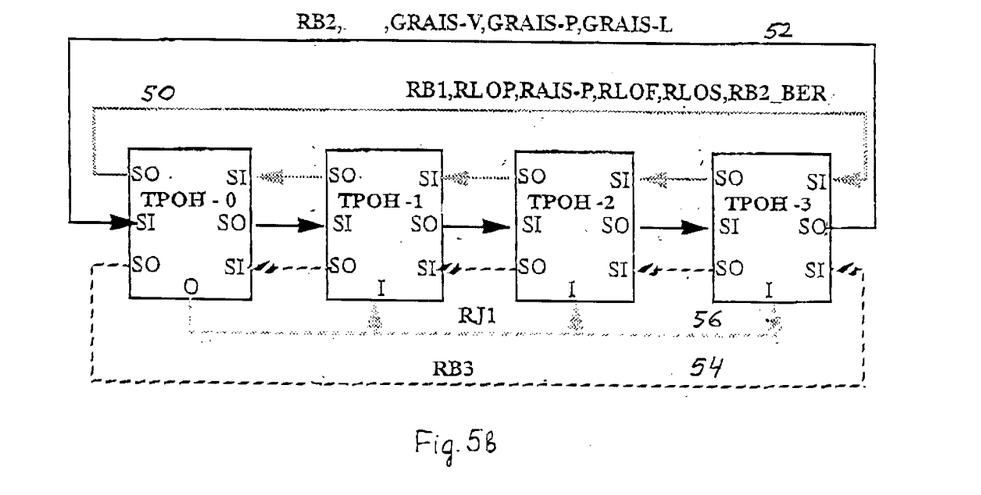
FIG. 5b is the diagram shown in FIG. 5a applied for the receive inter-chip communication.
Figure 5C:
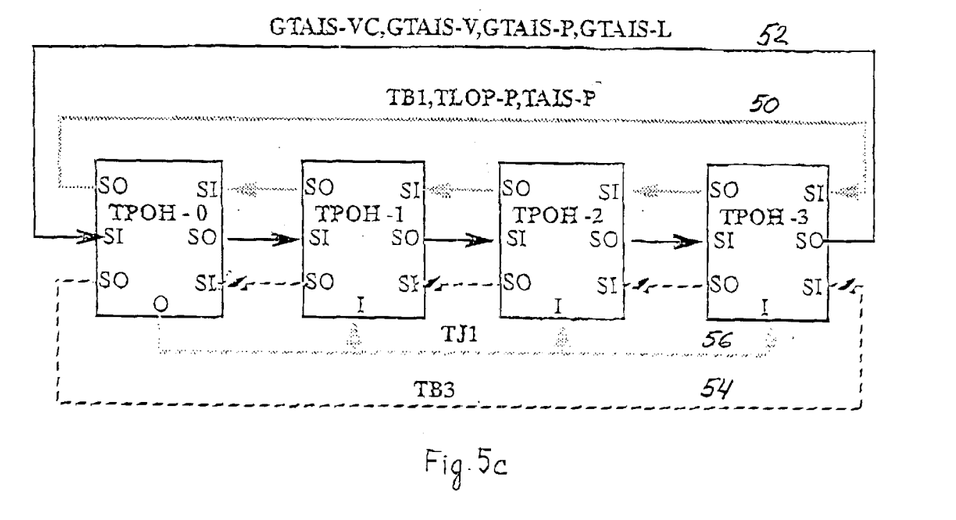
FIG. 5c is the diagram shown in FIG. 5a applied for the transmit inter-chip communication.

FIG. 5a schematically illustrates three serial and one parallel channels which are active in the inter-chip port for STM-4/STM-4c applications (i.e. in both modes), and during both the transmit inter-chip communication and the receive inter-chip communication. Four chips TPOH (i.e. capable of processing transport and path overheads of STM-1) are indicated TPOH-0, TPOH-1, TPOH-2 and TPOH-3, wherein the TPOH-0 is assigned as the master chip operating at a pre-selected so-called phase "0" of STM-4 signal (see, for example, FIG. 1 illustrating the byte-interleaved multiplexing: one of the bytes A,B,C or D may be selected to belong to phase "0"). The chips are interconnected by three serial channels 50, 52 and 54 and one parallel channel 56. Serial channels 50 and 54 have similar directions, where the communication starts from TPOH-3, is passed in sequence to TPOH-2, TPOH-1 and finally comes back to TPOH-0. Serial channel 52 has the opposite direction; in most cases it originates at TPOH-0, and goes to TPOH-1 via TPOH-2 and TPOH-3. In FIG. 5*a*, exemplary functions performed in these channels are indicated without referring to the receive or transmit character of the communication, but generally suit both. Functions being specific to the receive and transmit sides are shown in FIGS. 5*b* and 5*c*, respectively. The parallel channel 56 connects the master chip TPOH-0 with the slave chips to enable indicating the location of the payload start (the channel is marked with signal J1).

A starting sequence pattern is used for allocation of the starting point of a message sent in a serial port channel; the information bits are sent after the starting pattern has been issued. Each of the illustrated Serial Input ports (SI) associated with a chip obtains the starting sequence pattern, extracts the appropriate information bits from the incoming serial channel and transfers them to the internal blocks of the chip, per each frame. Each of the indicated Serial Output ports (SO) associated with a chip generates the starting sequence pattern preceding the bit stream information, maps the appropriate bits from the internal chip blocks and serializes the information bits to the outgoing serial channel, per each frame.

The serial channel 50 is intended for parity calculation of byte B1 and for informing the master (via neighbor chips) on alarms currently determined in any one of them. Byte B1 is allocated in TOH for regenerator section error monitoring. This function is a Bit Interleaved Parity 8 (BIP-8) code using even parity. The BIP-8 is computed over all bits of the previous STM-1 and is placed in byte B1 of the current frame. The alarms which can be determined in a particular chip are such as AIS-P (alarm indication signal in the pass) and LOP-P (loss of pointer in the path). The information in this channel flows from TPOH3 to TPOH0 and back to TPOH3. This channel operates using the 6.48 Mhz clock.

A second serial channel (marked 52) is intended for generating alarm commands (GAIS) based on the information obtained by the master with the aid of channel 50. The commands on issuing alarm indication signals are generated by the master TPOH-0 towards the slaves TPOHs, for example: GAIS-P (Generate Alarm Indication Signal in Path), GAIS-L (Generate Alarm Indication Signal in Line), GAIS-V (Generate Tributary Alarm Indication Signal). This channel operates at the 6.48 Mhz clock derived from the 77.76 Mhz rate.

A third serial channel 54 is intended for byte B3 partial calculation, per TPOH, for path error monitoring. B3 should comprise a result of BIP8 calculation of the whole payload for STM-4*c* signal. To notify the slaves when each of them should start its partial calculation, the location of the beginning of the SPE is sent by the master via the parallel channel 56. The B3 partial calculations are then sent serially from TPOH-3 till TPOH-0, thus accumulating the result. This channel operates at 6.48 Mhz clock.

As mentioned above, the parallel channel 56 serves exclusively for informing the slave chips on the location of the beginning of the synchronous payload envelope (signal J1 is generated using the pointer bytes H1, H2 and H3), to notify, when calculation of B3 should start.

FIG. 5*b* schematically shows a receive inter-chip communication performed by the inter-chip port channels illustrated in FIG. 5*a*. All functions of the channels are provided with prefix R(receive). It should be noted that, when handling a received signal, the serial channel 52 deals with generating an alarm RB2 (B2 errors). The B2 bytes are allocated for a multiplex section error monitoring function which is obtained by a specific parity calculation procedure. The B2 errors are separately calculated at different TPOHs and the result is to be accumulated in M1 byte which resides in TPOH-2. The direction of the information flow for the B2 calculation is usual (starting from TPOH-3, then TPOH0, TPOH1 an TPOH2). For generating alarm signals GRAIS-V, GRAIS-P and GRAIS-L the information flow starts from the master chip TPOH-0.

Receive channel 50 deals with collecting such additional currently determined alarms as RLOF (loss of frame), RLOS (loss of signal) and error RB2-BER. Collection of B2 errors is performed only in the receive regime, since STS-1 comprises one B2 byte of the line (being BIP8 of the line); STS-3=STM-1 may have already three B2 bytes, and STM-4–12 such B2 bytes of the lines. In the transmit regime there is no need for handling B2 bytes (in the inter-chip communication port).

FIG. 5*c* schematically shows a transmit inter-chip communication performed by the inter-chip port channels illustrated in FIG. 5*a*. The indications of the functions in the channels are therefore provided with prefix T. Channel 52 handles generation of an additional alarm GTAIS-VC (Generate Tandem Connection Alarm Indication Signal).

Figure 6:
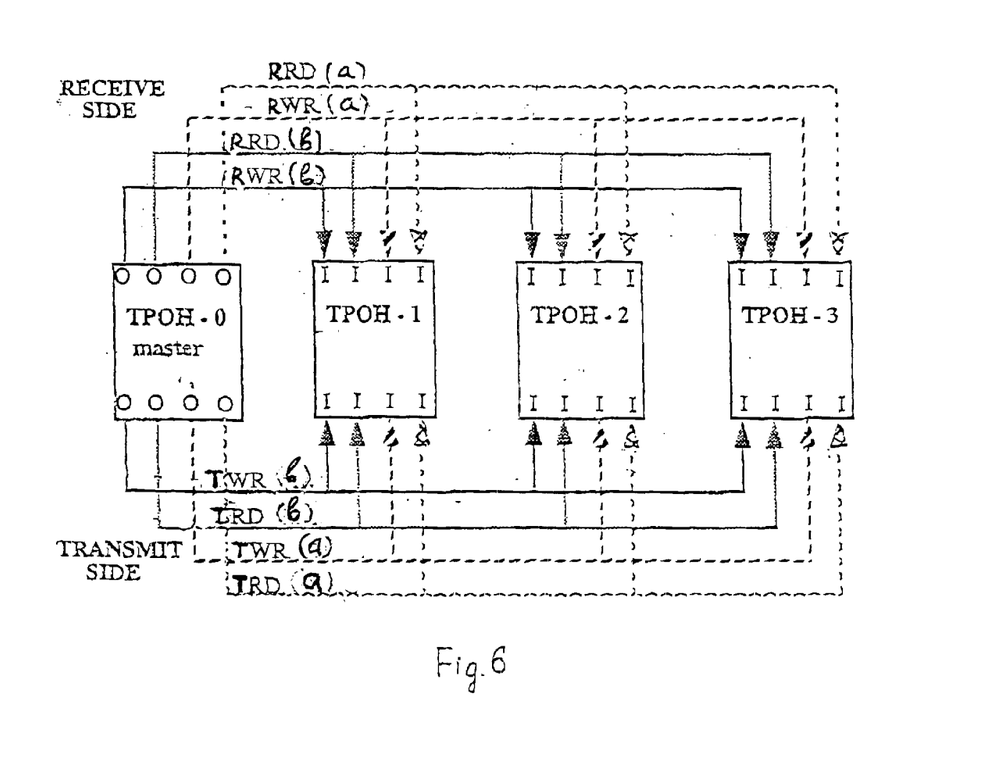
FIG. 6 is a block-diagram schematically illustrating inter-chip parallel communication provided by the inter-chip port in the concatenated mode.

FIG. 6 illustrates how the inter-chip communication port operates for coordinating the master chip (i.e., TPOH-0 working at phase 0 of signal STM-4) and other (slave) TPOHs in the concatenated mode. The figure shows both the Receive and the Transmit sides of the TPOHs operation. Outputs of the master chip are marked "O" and inputs of the slave chips are marked "I". The master defines the beginning of the STM-4*c*'s Synchronous Payload Envelope (SPE) and sends to the other TPOHs a number of signals based on which FIFOs of the chips should begin handling their portions of the payload. Remembering, that a FIFO plays part of a buffer between the line clock and the system clock, in the receive regime payload should be written in the FIFO with the line clock and read from the FIFO with the system clock; in the transmit regime the FIFO writes the payload with the system and reads it with the line. The mentioned signals (both for the receive and the transmit regimes), issued by the master chip, are directed to Read (RD) and Write (WR) counters of FIFOs and can be divided into two groups (a) and (b). Signals of the group (a) indicate for each of the chips the moment when both the Read counters and the Write counters of all the FIFOs should be 10 synchronously reset to one pre-determined value. Signals of the group (b) indicate to the read and write sides of the FIFO the place in the payload from where the writing into the FIFO and reading from the FIFO should start in this particular chip, and whether a specific byte of the SPE is a payload byte to be inserted in the FIFO, or a TOH byte which is to be neglected. In this manner, the module of four TPOHs each having a capability to handle ¼ of the STM-4 payload, succeeds in handling the whole STM-4*c* payload.

It should be appreciated, that other embodiments of the inter-chip communication port might be designed which are to be considered parts of the present invention. For example, the inter-chip communication port can be built for N=12, and each of the chips is responsible for processing SOH, LOH, POH of the STS1 signal. Another one among possible embodiments may constitute a recursive solution for even higher orders of the signals where, for example, four chip assemblies (each assembly supporting STM-64/STM-64c by means of a local inter-chip port provided between four IBM SMAT® chips or the like) are connected by another, higher level inter-assembly port and thus are capable of supporting STM-256/STM-256c.

What is claimed is:

1. A method for supporting concatenated type of a high order SDH/SONET signal with processing Transport Overhead bytes (TOH) and Path Overhead bytes (POH) thereof by:
   utilizing a group of chips comprising a master chip (master) and slave chips (slaves), each chip of the group being capable of supporting a lower order SDH/SONET signal with processing its TOH and POH, and
   arranging inter-chip communication between said chips to coordinate operation of the slaves by the master and provide processing the POH of said high order concatenated signal at the master, thereby providing operation of said chips in accord as one unit.

2. The method according to claim 1, wherein said SDH/SONET high order signal is an N-fold lower order SDH/SONET signal named a building block signal; the method includes:
   providing said group comprising N identical chips, wherein each of said chips having a FIFO,
   the step of arranging inter-chip communication between said chips in the group including:
   synchronous handling, by each of the N chips including the master, 1/N-th portion of said concatenated high order signal with processing the TOH of a respective building block signal,
   thereby providing operation of said chips in accord as one unit having N-fold FIFO.

3. The method according to claim 1, further enabling supporting a non-concatenated type of said SDH/SONET signal with processing Transport Overhead bytes (TOH) and Path Overhead bytes (POH) thereof, and wherein said non-concatenated SDH/SONET high order signal is an N-fold lower order SDH/SONET signal named a building block signal having its TOH and POH;
   the method comprising a step of re-arranging said inter-chip communication for enabling each of the chips to individually handle one respective said building block signal with processing the TOH and the POH thereof, thereby providing parallel handling of all said building block signals.

4. The method according to claim 3, including a step of reversibly re-arranging the inter-chip communication between two operation modes, wherein one of the modes is a concatenated mode corresponding to said concatenated signal transmitted over a single path, and the other mode is a non-concatenated mode corresponding to the non-concatenated signal transmitted over at least N paths.

5. The method according to claim 2, comprising a step of determining a location of the beginning of a synchronous payload envelope (SPE) of said high order signal and checking its concatenation indicator to enable said master chip to initiate said slaves in providing synchronous handling of respective portions of said high order signal.

6. The method according to claim 5, wherein said synchronous handling of the respective portions of the high order signal includes synchronously writing its payload portions into the FIFOs of said chips respectively, and synchronously reading said payload portions therefrom.

7. The method according to claim 6, including a step of simultaneously resetting read and write counters of all the FIFOs in the module by said master chip prior to said synchronous reading and writing.

8. The method according to claim 1, including passing alarms of a SONET/SDH protocol, if determined by at least one of the slave chips, to the master chip for generating common alarm signals to be reported therefrom, and transmitting a command generated by said master chips to said slave chips.

9. The method according to claim 1, including handling parity calculations over said high order signal using the inter-chip communication, said parity calculations being coordinated among said chips of the group in a serial fashion.

10. The method according to claim 3, wherein N is equal to 4, said SDH/SONET building block signal is the fundamental building block STM-1/STS-3, said high order SDH/SONET concatenated signal is STM-4c/STS-12c, and the high order SDH/SONET non-concatenated signal is STM-4/STS-12.

11. The method according to claim 3, wherein N is equal to 4, said SDH/SONET building block signal is a signal STM-4/STS-12, said high order SDH/SONET signal is either STM-16/STS-48, or STM-16c/STS-48c.

12. A module for supporting a concatenated type of a high order SDH/SONET signal with processing Transport Overhead bytes (TOH) and Path Overhead bytes (POH) thereof; the module comprising a group of chips, each of said chips being capable of supporting a lower order SDH/SONET signal with processing its TOH and POH, while one of them named a master chip is operative to coordinate operation of the remaining chips named slaves so as to cause them to work in accord as one unit, with processing the POH of said high order concatenated signal at the master chip.

13. The module according to claim 12, capable of supporting said concatenated high order SDH/SONET signal being an N-fold lower order SDH/SONET signal named a building block signal,
   said module comprises:
   the group of N identical chips, each of said chips having a FIFO;
   an inter-chip communication port operative in a concatenated mode where said master chip is capable of controlling said slaves in a manner that each of said chips including the master is caused to handle a 1/N-th portion of said concatenated high order signal with processing the TOH of its respective building block signal,
   thereby dividing said high order signal between the chips and causing them to work in accord as one unit having N-fold FIFO.

14. The module according to claim 13, further adapted to support a non-concatenated type of the high order SDH/SONET signal an N-fold lower order SDH/SONET signal named a building block signal having its TOH and POH, said inter-chip communication port being also operative in a non-concatenated mode where each of the chips individually handles one said building block signal and processes the TOH and the POH thereof, thereby providing parallel handling of all the building block signals.

15. The module according to claim 14, selectively operable in at least one of two operating modes including said concatenated mode corresponding to said concatenated signal, and said non-concatenated mode corresponding to said non-concatenated signal; for selecting the operating mode, said inter-chip communication port being re-configurable by a microcontroller.

16. The module according to claim 15, being capable of issuing an alarm if said high order SDH/SONET signal does not match the pre-selected operating mode of the module.

17. The module according to claim 13, wherein said master chip is capable of issuing commands informing said slaves on the beginning of the operation in accord for handling their respective portions of the concatenated high order signal payload.

18. The module according to claim 13, wherein said master chip is operative to synchronize the FIFOs of said chips to provide simultaneous resetting of the read and write counters thereof, and further to initiate synchronous FIFO read and write operations in all the chips in the module, thereby causing said FIFOs to handle respective payload portions of the concatenated high order signal.

19. The module according to claim 12, comprising an inter-chip communication port including:
   a plurality of controllable serial channels arranged between said chips, wherein in each of the serial channels a serial output port of one chip is connected to a serial input port of one adjacent chip, and
   a plurality of controllable parallel channels between said chips, wherein in each of the parallel channels an output port of the master chip is connected to input ports of the slaves chips;
   said serial and parallel channels being operative both in the receiving and the transmitting directions.

20. The module according to claim 19, wherein one of said serial channels is intended for collecting alarms indications, if determined by at least one of the slave chips, and passing thereof to the master chip.

21. The module according to claim 19, wherein one of said serial channels is intended for generating alarm signals to be reported from said module.

22. The module according to claim 19, wherein one or more of said serial channels serves for handling parity calculations in the module over the high order signal's payload, said parity calculations being coordinated among the chips of the module in a serial fashion.

23. The module according to claim 19, wherein said parallel channels serve for notifying on the beginning of the synchronous payload envelope (SPE) of the concatenated high order signal and for synchronizing operations of FIFOs of the slave chips, provided by the master chip to the slave chips in the case of the concatenated high order signal.

24. The module according to claim 14, wherein said N is equal to 4, said SDH/SONET building block signal is the SDH fundamental building block STM-1/STS-3, and said high order SDH/SONET signal is either STM-4/STS-12, or STM-4c/STS-12c.

25. The module according to claim 14, wherein said N is equal to 4, said SDH/SONET building block is STM-4/STS-16, and said high order SDH/SONET signal is either STM-16/STS-48, or STM-16c/STS-48c.

26. A module for supporting high order concatenated and/or non-concatenated SDH/SONET signals (STM-N and STM-Nc)/(STS-N and STS-Nc), the module comprising four chips each being capable of handling an STM-(1/4)N or STS-(1/4)N building block signal, and an inter-chip communication port; each of said chips being capable of supporting said building block SDH/SONET signal with processing its Transport Overhead bytes TOH and Path Overhead bytes POH, said chips named a master chip being operative to coordinate operation of the remaining chips named slaves via said inter-chip communication port so as to cause them to work in accord as one unit,
   and wherein said inter-chip communication port comprises a plurality of controllable serial channels arranged between said chips; one of said serial channels is utilizable for collecting alarms indications, if determined by at least one of the slave chips, and passing thereof to the master chip, and another of said serial channels is utilizable for transmitting a command generated by said master chip to said slave chips; and said serial channels are operative both in the receiving and the transmitting directions.

27. The module according to claim 26, adapted for supporting said concatenated high order signal and wherein the inter-chip communication port further comprises a plurality of controllable parallel channels between said chips, wherein in each of the parallel channels an output port of the master chip is connected to input ports of the slave chips; said parallel channels being operative both in the receiving and the transmitting directions for notifying, from the master chip, on the beginning of a synchronous payload envelope (SPE) of the concatenated high order signal and for synchronizing operations of FIFOs of the slave chips.

28. The module according to claim 26, wherein said plurality of serial channels in the inter-chip communication port is utilizable for performing parity calculations over the high-order signal.

29. The module according to claim 27, wherein said master chip is operative to process the POH of said concatenated high order signal.

30. The module according to claim 26, reversibly configurable between two operation modes, wherein one of the modes is a concatenated mode corresponding to said concatenated high order signal and, the other mode is a non-concatenated mode corresponding to the non-concatenated high order signal.

* * * * *